Dec. 1, 1931.          C. S. SMITH          1,834,502
CUSHIONED SPRING HANGER CONNECTION FOR AUTOMOBILE FRAMES
Filed May 3, 1924          2 Sheets-Sheet 1
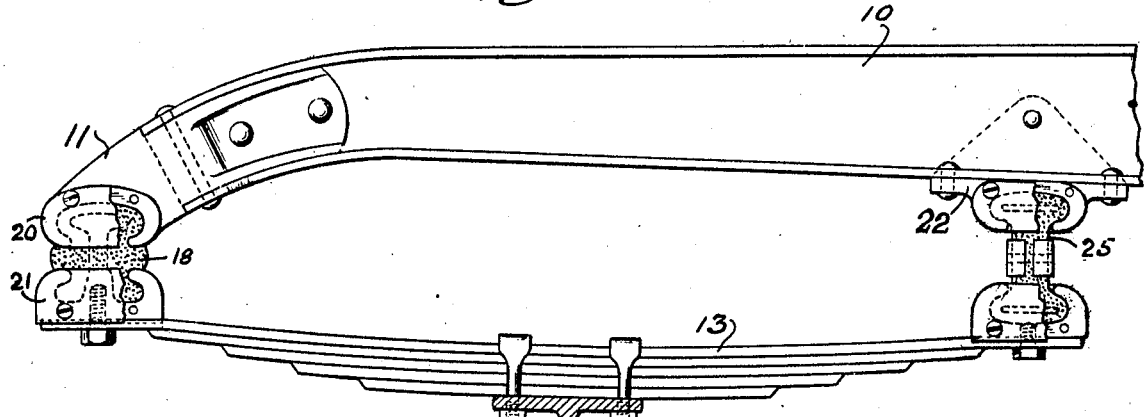
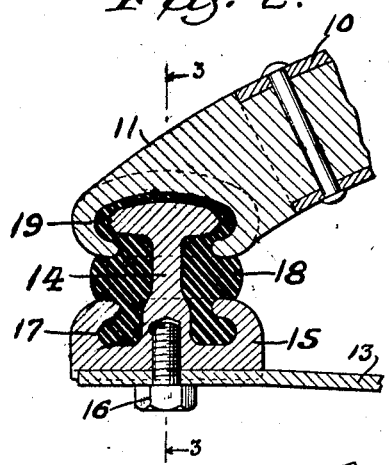
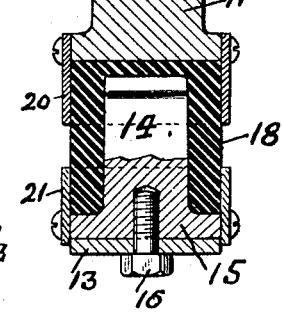
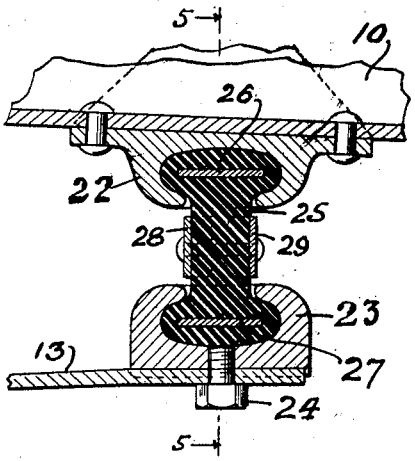
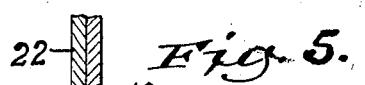
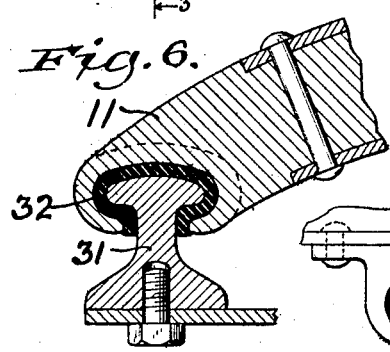
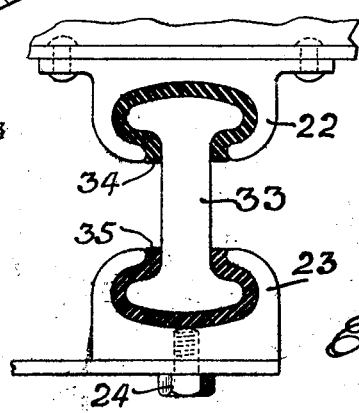
INVENTOR.
Charles S. Smith,
BY
Erwin, Wheeler & Woolard
ATTORNEYS.

Dec. 1, 1931.  C. S. SMITH  1,834,502
CUSHIONED SPRING HANGER CONNECTION FOR AUTOMOBILE FRAMES
Filed May 3, 1924  2 Sheets-Sheet 2

INVENTOR:
Charles S. Smith

ATTORNEYS.

Patented Dec. 1, 1931

1,834,502

UNITED STATES PATENT OFFICE

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK

CUSHIONED SPRING HANGER CONNECTION FOR AUTOMOBILE FRAMES

Application filed May 3, 1924. Serial No. 710,702.

The invention relates to an improved construction of spring hanger connection between the frame of an automobile and the supporting springs, and one of its purposes is the substitution for the usual metal-to-metal connection at such points of a wholly non-metallic cushioned connection, so that the necessity for lubrication of the connected parts is obviated.

The side bars of the frame are provided with spring hangers, to which the ends of the supporting springs are connected through the medium of the non-metallic cushioned and resilient members, in such manner that restraint is imposed upon the longitudinal movement of the sprung weight of the automobile with relation to the unsprung weight thereof, when obstructions or unfavorable road conditions are encountered in the operation of the automobile. This result is attained by the arrangement of a fixed connecting post between the end of the spring and the side bar, the cushioning member being so disposed about the post as to enclose the same and avoid any metal-to-metal contact between the connected parts, which have but a very slight movement with relation to each other, and only in the degree permitted by the resilient nature of the interposed cushioning member or block.

The fixed post referred to is employed in connecting the front end of the spring to the hanger at the end of the side bar, but the connection at the other end of the spring with the intermediate hanger may yield in a larger degree so as to permit variations in the length of the spring in accordance with the load, such second connection not being fixed as is the first one. In each case, however, a wholly non-metallic connection is made at the ends of the spring, so that in addition to avoiding any necessity for lubrication, and the consequent wear upon the parts where a metal-to-metal connection is used, I also entirely eliminate the squeaks and noises incident to the friction of improperly lubricated metal parts, as where the ends of the spring are pivoted to the spring hanger, or to an interposed shackle, as is generally resorted to in constructions of this nature.

The details of construction embodied in the improvement will now be described, and the novelty of my invention will be pointed out in the appended claims.

Referring to the accompanying drawings:

Figure 1 is a view in side elevation of the forward end of one of the side bars of an automobile frame, and showing the improved manner in which the supporting spring is connected at its ends to the spring hangers of the side bar.

Fig. 2 is a longitudinal vertical section, somewhat enlarged, through the connection at the forward end of the side bar.

Fig. 3 is a transverse vertical section on the line 3—3, Fig. 2, looking in the direction of the arrows.

Fig. 4 is a longitudinal vertical section through the connection at the rear end of the spring.

Fig. 5 is a transverse vertical section on the line 5—5, Fig. 4, looking in the direction of the arrows.

Fig. 6 shows in longitudinal vertical section a modified form of the connection with the side bar at the forward end of the spring.

Fig. 7 shows in side elevation a modified form of the connection to the side bar at the rear end of the spring.

Figure 8:
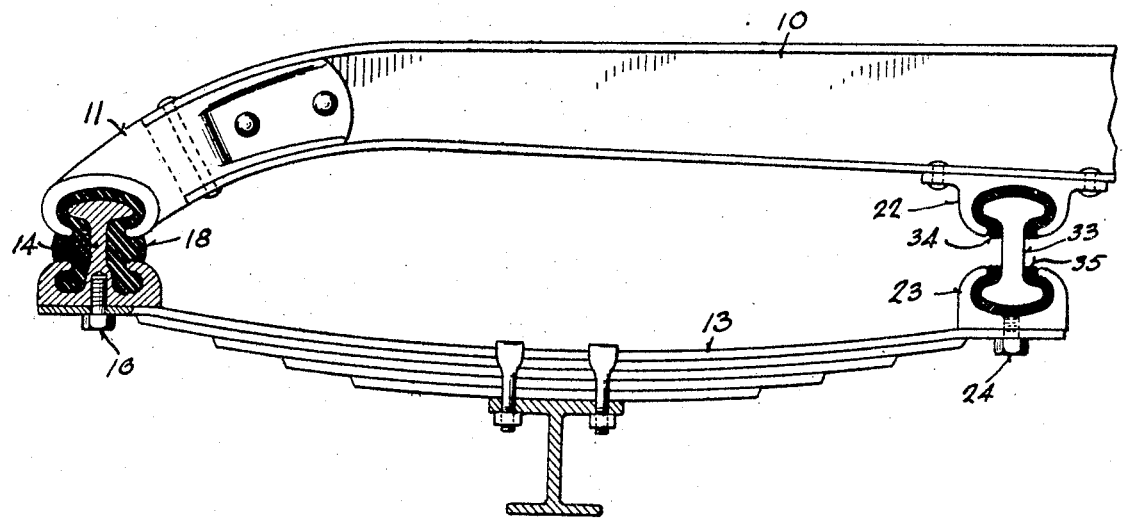
Fig. 8 shows in side elevation a completed structure involving some of the features of my invention.

Referring now to the drawings, the numeral 10 indicates a forward end portion of one of the side bars of an automobile frame, the said side bar having associated therewith spring hangers 11 and 22, attached to or formed upon the side bar, the said spring hangers being spaced apart to permit connection with the opposite ends of the supporting spring 13.

The spring hanger 11 is shown herein as located in the channel of and connected to the side bar by means of rivets, as usual. The outer end of the spring has firmly attached thereto a post 14, Fig. 2. The latter is provided with a base 15 resting upon the spring to which it may be secured by any suitable means such as a cap screw 16 passing through a perforation in the spring and threaded into the base of the post. The post is somewhat elongated or widened transversely of the spring, as shown in Fig. 3, so as to endow it with stability and prevent lateral displacement of the side bar with relation to the spring. In its longitudinal vertical section the head of the said post appears as of T-shape, and the upper side of the base at each side of the post is provided with an undercut recess as at 17. A block of cushioning resilient material 18 is molded about the post, the material at the lower end of the block flowing into and filling the recess 17, so as to surround and completely enclose the post and be anchored thereon and in the said recess.

The end of the spring hanger 11 is recessed as at 19 in a manner which closely corresponds in its formation to that of the recess 17. In practice, the unattached spring hanger 11 and the block 15 carrying the post, will be properly spaced in a mold so that the contiguous surfaces of the T-head of the post 14 and spring hanger 11 are out of contact, the T-head having been placed laterally into the recess in the hanger, and into the space thus formed the material of which the resilient block 18 is constituted will be molded so as to produce a connected structure. Or, the cushioning block may be molded about the post, and the spring hanger may be formed of metal sufficiently ductile to permit its being pressed into shape, so as to embrace the upper end of the cushioning block 18, in the manner illustrated. Or, again, the molded block upon the post may be forced laterally into the recess of the spring hanger.

The width of the T-head of the post 14, Fig. 2, exceeds that of the contracted opening leading to the recess 19 in the spring hanger, so as to over-hang such contracted portions when assembled, and withdrawal of the head of the said post from such recess in the elongation of the block 18 under tension, is prevented. Plates 20 and 21 attached respectively to the spring hanger 11 and the base 15 of the post 14, may be employed for maintaining the cushioning block in proper position.

The construction just described constitutes a relatively fixed and comparatively rigid connection between the front end of the supporting spring 13 and the spring hanger attached to or formed at the forward end of the side bar. As before indicated, such manner of connection is desirable in order that longitudinal or lateral movement of the sprung superstructure may be prevented when the running gear or unsprung structure encounter unfavorable road conditions. Changes in the length of the supporting springs will occur when the automobile is loaded, and also when vibration is induced by adverse road conditions. It is desirable to compensate for such elongation, and I do this by mounting the connection between the spring hanger at the rear end of the spring and the spring so that such connection may have capacity for slight swinging movement in the direction of the length of the side bar. I achieve this last mentioned result by forming the rear spring hanger 22 with an undercut recess similar in contour to the recess 19 of the front spring hanger 11, the spring hanger 22 being attached to the side bar by any suitable means. I form also a base block 23, attached to the rear end of the spring conveniently by means of a cap screw 24 passing through a perforation in the end of the spring and threaded into an opening in the base block 23, the said base block being provided with an undercut recess corresponding in outline to that of the spring hanger 22. The connection of the spring hanger 22 and the base block 23 is effected by means of a specially constructed cushioning block 25, formed as a link, embedded in the enlarged ends of which are metal strips 26 and 27, each having a width in excess of the contracted openings of the recesses in the parts 22 and 23, so that the enlarged ends of the cushioning block seated in the said recesses cannot be withdrawn when such block is subjected to distension incident to vibrations which occur in the operation of the automobile. But this arrangement permits a slight swinging movement of the cushioning block longitudinally of the side bar upon the hanger 22 as an axis, at the times that the spring is varied in length, as described. To prevent undue contraction in the length of the block due to reaction from the distending vibrations, I confine the said block against expansion by placing around its reduced waist, flanged metal plates 28 and 29, which are connected by rivets 30 to complete the structure.

In Fig. 6 I have shown a modification in the manner of constructing the post attached to the forward end of the spring. The post 31 is provided with a T-head as before, such head having molded thereon a cushioning block 32 designed to fill the space between the T-head and the walls of the recess in the spring hanger 11, a part of the stem of the post being also embraced by the cushioning block. This construction affords the same fixed anchorage as before described.

In Fig. 7 I have illustrated a modification of the connection at the rear end of the spring, the hanger 22 and the block 23 being provided with undercut recesses, as in Fig. 4. In making this modified connection I form a link 33, the opposite ends of which are enlarged into T-heads of the construction previously described. About these T-heads I mold cushioning blocks 34 and 35, for reception by the recesses in the spring hanger 22 and block 23. The T-heads of the link 33, as before, have a width which exceeds that of the contracted openings of the recesses into which they are placed, so that rocking of the link 33 upon its upper end as an axis will occur with the elongation of the supporting spring, but separation of the parts will be prevented by reason of the nature of the connection.

From the foregoing, it will be seen that I have produced a wholly non-metallic connection between the supporting springs and the side bars of the frame, so that the necessity for lubrication of the connection is avoided, and consequent wear of the parts, together with noise due to improper lubrication, is eliminated. The plan described of effecting a comparatively rigid cushioned connection at the forward end of the spring with a yielding cushioned connection at the rear end of the spring, I believe to be wholly new. Although I have shown and described my invention with relation to a particular use, it is obvious that the invention is not to be limited to such use, but may be adapted to other uses where the present form of connection may be advantageous.

Having thus described my invention, what I claim and desire to secure by Letters Patent of the United States, is:

1. A device for connecting the sprung and unsprung parts of an automobile comprising oppositely arranged throated recesses in said parts, cushioning means arranged in said recesses, and a rigid member for connecting said parts and having portions thereof imbedded in said cushioning means.

2. A device for connecting the sprung and unsprung parts of an automobile comprising a throated recess in each of said parts, cushioning means disposed in said recesses, and connecting said parts and means for retaining said cushioning means in said recesses and for reinforcing said cushioning means between said parts.

In testimony whereof, I have signed my name at Milwaukee, this 30th day of April, 1924.

C. S. SMITH.